United States Patent  (10) Patent No.: US 9,077,742 B2
Åström et al.  (45) Date of Patent: *Jul. 7, 2015

(54) SYSTEM AND METHOD FOR COMMUNICATION SESSION CORRELATION

(71) Applicant: TELEFONAKTIEBOLAGET L M ERICSSON (PUBL), Stockholm (SE)

(72) Inventors: Michael Åström, Stockholm (SE); Ioannis Fikouras, Alsdorf (GE); Salvatore Loreto, Helsinki (FI); Elena Fersman, Uppsala (SE); Goran Anders Petter Eriksson, Norrtalje (SE); Roman Levenshteyn, Aachen (GE); Gonzalo Camarillo, Helsinki (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 35 days.

This patent is subject to a terminal disclaimer.

(21) Appl. No.: 14/011,044

(22) Filed: Aug. 27, 2013

(65) Prior Publication Data

US 2014/0059240 A1 Feb. 27, 2014

Related U.S. Application Data

(63) Continuation of application No. 13/153,604, filed on Jun. 6, 2011, now Pat. No. 8,625,602, which is a continuation of application No. 11/549,746, filed on Oct. 16, 2006, now Pat. No. 7,983,240.

(51) Int. Cl.
*H04L 12/28* (2006.01)
*H04L 29/08* (2006.01)
*H04L 27/26* (2006.01)

(52) U.S. Cl.
CPC .......... *H04L 67/141* (2013.01); *H04L 27/2601* (2013.01)

(58) Field of Classification Search
CPC ..................................................... H04L 67/141
USPC ........................................................ 370/395
See application file for complete search history.

(56) References Cited

U.S. PATENT DOCUMENTS

| 7,707,240 | B2* | 4/2010 | Marascio et al. ............. 709/202 |
| 8,625,602 | B2* | 1/2014 | Jansson et al. ............. 370/395.1 |
| 2004/0073658 | A1 | 4/2004 | Oran et al. |
| 2004/0252674 | A1 | 12/2004 | Soininen et al. |
| 2005/0058125 | A1 | 3/2005 | Mutikainen et al. |
| 2006/0046757 | A1 | 3/2006 | Hoover et al. |
| 2006/0093101 | A1 | 5/2006 | Patel et al. |
| 2006/0212511 | A1* | 9/2006 | Garcia-Martin ............. 709/203 |

(Continued)

OTHER PUBLICATIONS

E. Henrikson, "Private SIP Extension for Original Dialog Identifier," Internet Draft, Lucent Technologies, May 2002.

(Continued)

*Primary Examiner* — Wei Zhao

(57) ABSTRACT

A system and method for correlating communication sessions. A globally unique correlation identifier is created and exchanged between the parties during Session Initiation Protocol (SIP) session setup to allow for association and correlation of additional SIP sessions between the same parties or with additional parties. The correlation information may then be used by network and session entities to perform different services.

22 Claims, 7 Drawing Sheets

(56) References Cited

U.S. PATENT DOCUMENTS

2006/0294245 A1\* 12/2006 Raguparan et al. ........... 709/227
2007/0064672 A1    3/2007 Raghav et al.

OTHER PUBLICATIONS

J. Rosenberg et al: "SIP: Session Initiation Protocol". Network Working Group, Request for Comments: 3261. Jun. 2002.

B. Campbell, et al.: "Session Initiation Protocol (SIP) Extension for instant Messaging". Network Working Group, Request for Comments: 3248. Dec. 2002.

R. Sparks, "The Session Initiation Protocol (SIP) Refer Method". Network Working Group, Request for Comments: 3515. Apr. 2003.

S. Loreto, et al. "The Session Initiation Protocol (SIP) Dialog Correlation," SIPPING Working Group: Internet Draft, Ericsson, Jun. 25, 2006.

\* cited by examiner

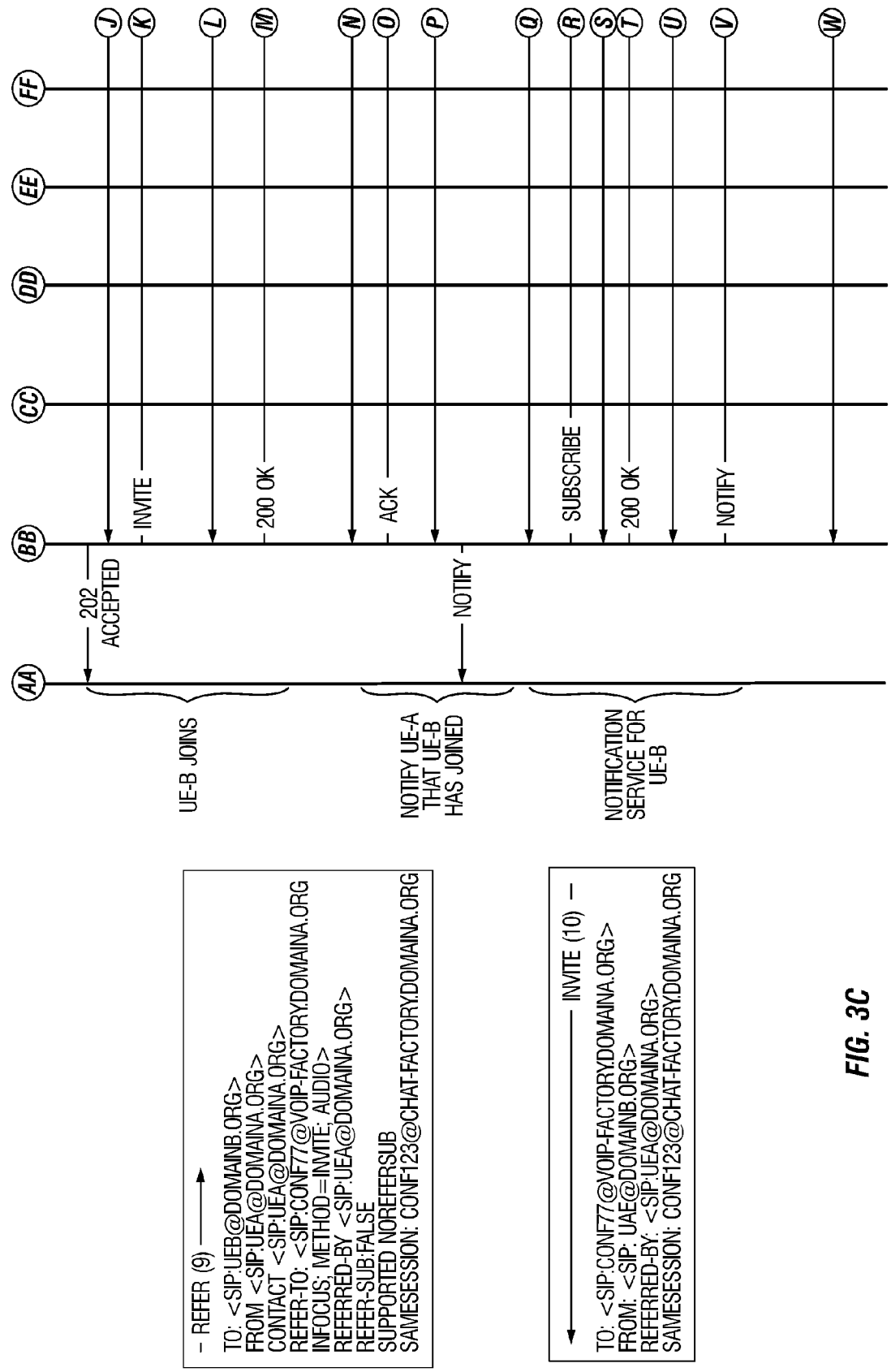

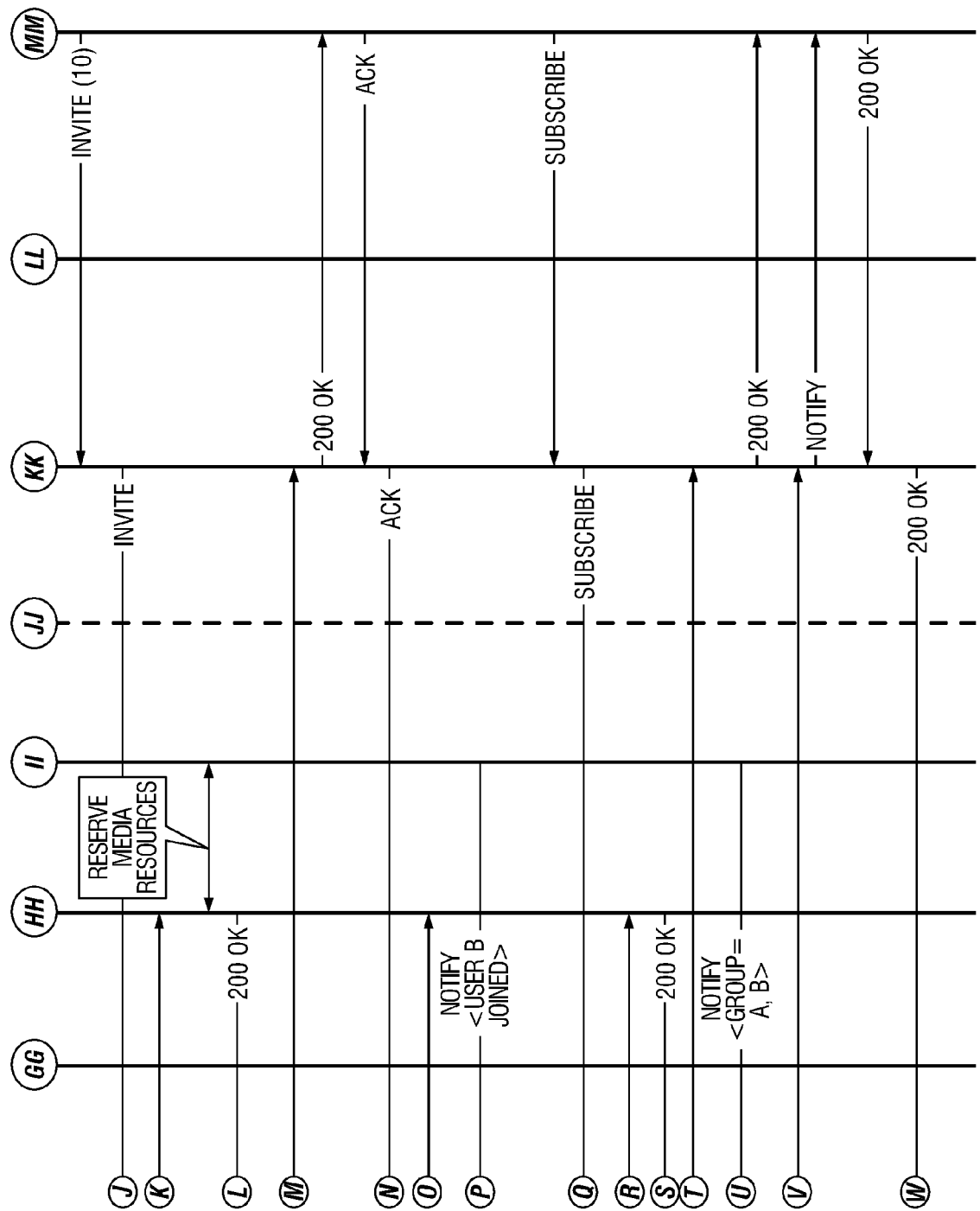

SYSTEM AND METHOD FOR COMMUNICATION SESSION CORRELATION

CROSS-REFERENCE TO RELATED APPLICATIONS

This application is a continuation of co-pending U.S. patent application Ser. No. 13/153,604 filed Jun. 6, 2011, which is a continuation of U.S. patent application Ser. No. 11/549,746 filed Oct. 16, 2006, now U.S. Pat. No. 7,983,240, the disclosures of which are fully incorporated herein by reference.

BACKGROUND OF THE INVENTION

The present invention relates generally to communication systems. More particularly, and not by way of limitation, the invention is directed to a system and method for correlating different communication sessions.

Correlation is a mathematical term for a statistical measurement on the degree of dependency of two variables. In mathematics, a correlation coefficient is used to indicate the strength and direction of a linear relationship between two random variables. In communication systems, it is desirable to know whether two or more sessions used to set up media streams are correlated in some sense (for example, in the sense that they are used in the same context). Such sessions may be set up and operated under the Session Initiation Protocol (SIP) or other suitable communication protocol. On the terminal side, such a correlation could mean, for example, displaying text from a chat session and video from another session in the same terminal window. On the network side, it could mean, for example, applying some special charging scheme to a multi-service session comprised of two or more individual sessions.

In order to provide these and similar services, it must be determined and communicated how sessions relate to each other. However, there is no inherent mechanism in today's networks that provides the capability to indicate correlation between SIP sessions. Rather, higher level applications utilizing multiple SIP sessions must correlate the sessions at the application level using information available to each particular application. Due to the lack of inherent correlation mechanisms, however, the application level correlations may lead to false correlation assumptions.

What is needed in the art is a system and method for correlating different communication sessions which overcomes the shortcomings of the prior art. The present invention provides such a system and method.

BRIEF SUMMARY OF THE INVENTION

The present invention provides a system and method for correlating communication sessions. The invention creates and exchanges between the parties, a globally unique correlation identifier during SIP session setup to allow for association and correlation of SIP sessions. The correlation information may then be used by network and session entities to perform different services.

Thus, in one aspect, the present invention is directed to a method of correlating different communication sessions. The method includes creating a globally unique correlation identifier during establishment of a first communication session between a first entity and a second entity; storing the correlation identifier by the first and second entities; and utilizing the correlation identifier to correlate with the first session, a subsequent session established between the first and second entities.

In another aspect, the present invention is directed to a system for correlating different communication sessions. The system includes means for creating a globally unique correlation identifier during establishment of a first communication session between a first entity and a second entity; means for storing the correlation identifier by the first and second entities; and means for utilizing the correlation identifier to correlate with the first session, a subsequent session established between the first and second entities.

BRIEF DESCRIPTION OF THE SEVERAL VIEWS OF THE DRAWING

In the following, the essential features of the invention will be described in detail by showing preferred embodiments, with reference to the attached figures in which:

FIGS. 3A-3D are portions of a signaling diagram illustrating the flow of messages between various network entities when performing the correlation process in a group communication case in accordance with the present invention.

DETAILED DESCRIPTION OF THE INVENTION

Figure 1:
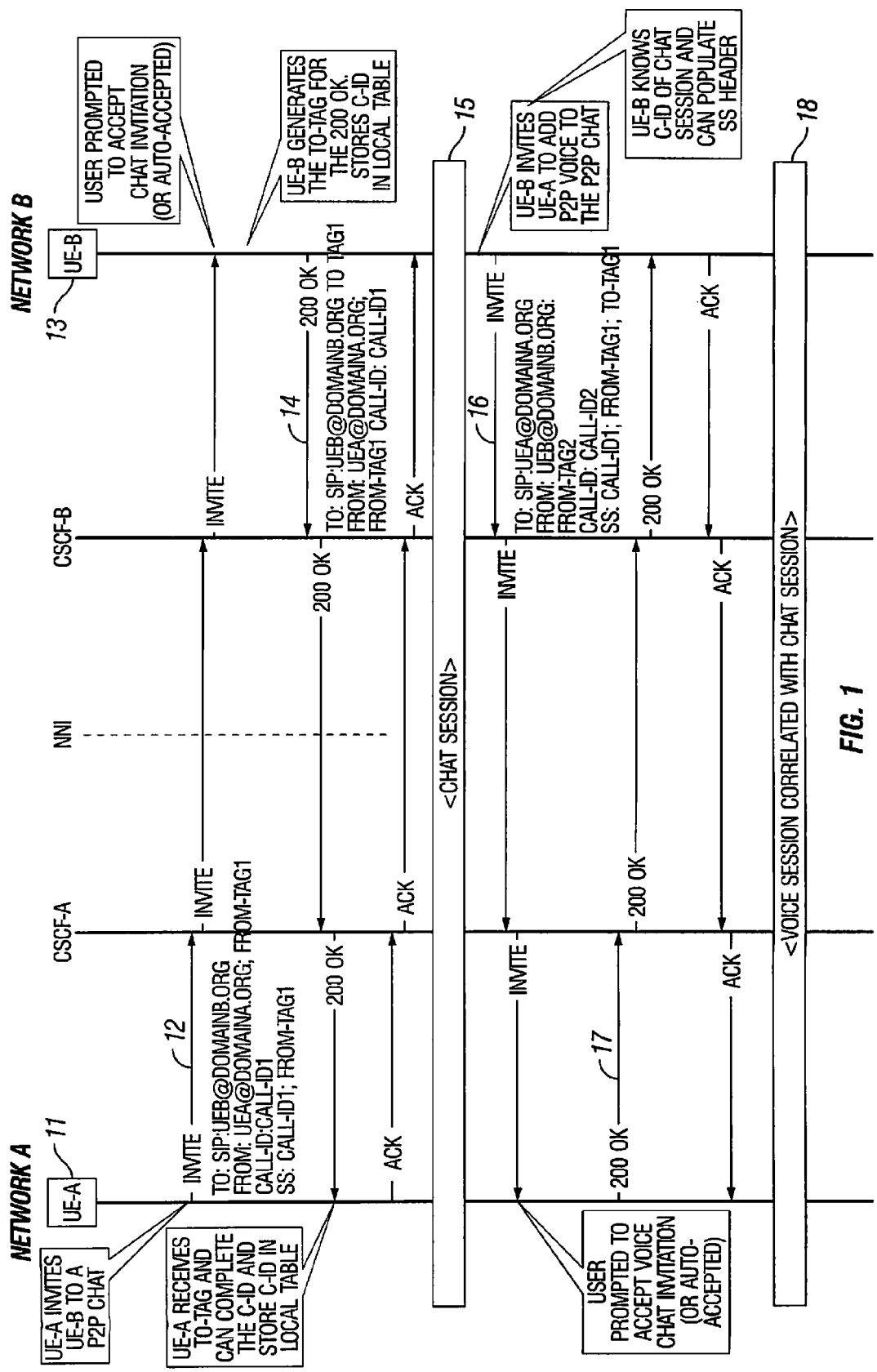
FIG. 1 is a signaling diagram illustrating the flow of messages between various network entities when establishing a SIP session utilizing a Same-Session (SS) header in accordance with the teachings of the present invention.

The present invention provides a system and method for correlating communication sessions. The invention creates and exchanges between the parties, a globally unique correlation identifier during SIP session setup to allow for association and correlation of SIP sessions. The correlation information may then be used by network and session entities to perform different services. It should be noted that sessions may be conducted between fixed terminals, mobile terminals, user agents, network nodes, and the like. The term "entities" is used herein to encompass all terminals, agents, nodes, and the like that may be parties to sessions. This invention is also described in S. Loreto et al., "The Session Initiation Protocol (SIP) Dialog Correlation", IETF SIPPING Working Group Internet Draft, Jun. 25, 2006, which is incorporated by reference herein in its entirety. This draft is available online at http://tools.ietf.org/wg/sipping/draft-loreto-sipping-dialog-correlation-01.txt.

In an exemplary embodiment, the present invention communicates a correlation identifier (ID) in a new header with the label "Same-Session" added to the SIP INVITE and REFER messages. In one embodiment, the correlation ID may be communicated between two user agents (UAs) in a simple point-to-point (P2P) scenario in which both UAs have all the information required to uniquely identify the dialog (Call-ID, From-Tag, and To-Tag) with one correlation ID. In other embodiments addressing the use of intermediaries (for example a business-to-business (B2B) UA, group communications, and use of multiple correlation IDs, the correlation ID may be sent to multiple entities.

In the preferred embodiment, the invention creates and exchanges a globally unique correlation ID during IP Multimedia Subsystem (IMS) session establishment. The exchange of the globally unique correlation ID provides the ability to associate and correlate independent IMS sessions (for example, SIP sessions). The correlation IDs may be transported in a SIP header field.

The preferred embodiment for the correlation ID is a value comprising a number of attributes derived from the SIP session. In the P2P case, the correlation ID preferably includes three parameters: Call-ID, To-Tag, and From-Tag. Although the Call-ID and From-Tag make the correlation ID globally unique on their own, the To-Tag is needed to address the scenario of forking proxies in the path of signaling. Thus, the P2P correlation ID may take the form:

Same-Session: Call-Id; From-Tag; To-Tag

For example, the P2P correlation ID may appear as:

Same-Session: 3s09cs03; ty20s; d92119.

In the P2P case, the Call-ID and From-Tag are derived from the INVITE request, and the To-Tag is derived from the 200 OK response to the request. For example in a session setup request, the Call-ID, From-Tag, and To-Tag may appear as:

```
INVITE sip:alice.doe@home1.net SIP/2.0
From: <sip:elisa.coya@example.net>;tag=ty20s
To: <sip:alice.doe@home1.net>
Call-ID: 3s09cs03
```

The response message may include the following fields:

```
SIP/2.0 200 OK
From: <sip:elisa.coya@example.net>;tag=ty20s
To: <sip:alice.doe@home1.net>;tag=d92119
Call-ID: 3s09cs03
```

In the case of an intermediary (e.g., a B2B UA) inside the signaling path between the two UAs, additional logic is required, both in the UAs and in the B2B UA. This enables the exchange of the aforementioned information between the two independent sessions established by the intermediary with two communication partners.

In the intermediary case, the Call-ID is different on the receiving and transmitting sides of the intermediary. For example, the two Call-IDs may take the form:

```
Same-Session: Focal Point URI
Same-Session: conf123@factory.domainA.org
```

In the group communication cases, the correlation ID may include a single focal point URI, which is inherently unique and is assigned by the conference factory during conference creation. The focal point URI is used to create the correlation ID. The correlation ID is unique because the conference factory assigns unique URIs to each new conference instance. The focal point URI is communicated to the creator of the conference during the conference creation process (in the contact header of the 200 OK).

In a dial-in conference scenario, a REFER request is then submitted from the creator of the conference to the other participant(s). The Same-Session header in the REFER request contains the focal point URI as the correlation ID as described above. In this case, the correlation ID value is inserted in the Refer-to header.

If the invitation is accepted, the receiver of the REFER request then issues an INVITE request to the focal point containing the same correlation ID in the Same-Session header.

In a dial-out scenario the procedure is the same with the exception that the REFER request is sent to the focal point responsible for issuing the INVITE request(s).

For example, a conference creation request sent to a conference factory may take the form:

```
INVITE sip:conf_fact@domainA.org SIP/2.0
From: <sip:ueA@domainA.org>;tag=ty20s
To: <sip:conf_fact@domainA.org>
```

A response to the conference creation request containing a focal point URI may take the form:

```
SIP/2.0 200 OK
From: <sip:ueA@domainA.org>;tag=ty20s
To: <sip:conf_fact@domainA.org>;tag=d92119
Contact:<sip: conf123@factory.domainA.org>
```

A REFER message containing the correlation ID (focal point URI) may then take the form:

```
REFER sip:b@domainB.org SIP/2.0
From: <sip:a@domainA.org>;tag=193402342
To: <sip:b@domainB.org>
Contact: <sip:a@domainA.org>
Refer-To: conf456@factory.domainA.org?Same-
Session=conf123@factory.domainA.org; text
Same-Session: conf123@factory.domainA.org
```

The present invention includes a method of correlating independent IMS sessions in independent correlation groups. During the establishment of a new session, a new correlation ID is created and used. If the new session should be correlated with an existing session, the correlation ID of the existing session is used. All sessions using the same correlation ID are considered to be correlated.

FIG. 1 is a signaling diagram illustrating the flow of messages between various network entities when establishing a SIP session utilizing a Same-Session (SS) header in accordance with the present invention. During the establishment of the first, new, session (not to be correlated with an existing session), UE-A 11 populates the Same-Session header of the INVITE message 12 with two out of three of the correlation ID parameters (i.e., the Call-ID and the From-Tag). The third parameter (i.e., the To-Tag) is created by UE-B 13 and is included in the 200 OK response message 14. Once the establishment procedure is complete, both parties may store the correlation ID in a local correlation table or other mapping construct (e.g., table, hash, and the like) and may use the correlation ID when establishing future sessions. The session, in this example a chat session 15, is then established.

An exemplary mapping table is shown in Table 1 below. The mapping table is used to associate correlation IDs with session IDs. Additional entries such as the media type may be included, but are not required for mapping purposes.

TABLE 1

| Correlation ID | Dialogue ID | |
|---|---|---|
| Call-ID1, From-Tag1, To-Tag1 | Call-ID1, From-Tag1, To-Tag1 | Chat session |
| Call-ID1, From-Tag1, To-Tag1 | Call-ID2, From-Tag2, To-tag2 | VoIP session |

Still referring to FIG. 1, at some later point in time, UE-B 13 adds a VoIP component to the ongoing chat by establishing a new SIP session. In order to correlate the new session to the existing one, UE-B uses the dialogue ID (i.e., session identifier) of the ongoing chat session as a key to perform a search in the correlation table and fetch the correlation ID for use in the correlation procedure. UE-B places the correlation ID in a Same-Session header of the INVITE message 16 and sends it to UE-A 11.

Upon receiving the INVITE message 16 with the Same-Session header containing a complete correlation ID (i.e., with all three parameters), UE-A 11 interprets this as a session that should be correlated with an existing session. UE-A then accesses its correlation table to find a match for the correlation ID received. If a match is found, it means that UE-A is already part of an ongoing session to which the correlation ID points. The new, now correlated session, is inserted as a new entry in the table. If a match is not found, UE-A may add the correlation ID to the table, thereby acknowledging the correlation to an existing session in which it (UE-A) is not involved. UE-A accepts in a 200 OK message 17, and the P2P voice session is established and correlated with the P2P chat session at step 18. Alternatively, UE-A may reject the request.

Figure 2:
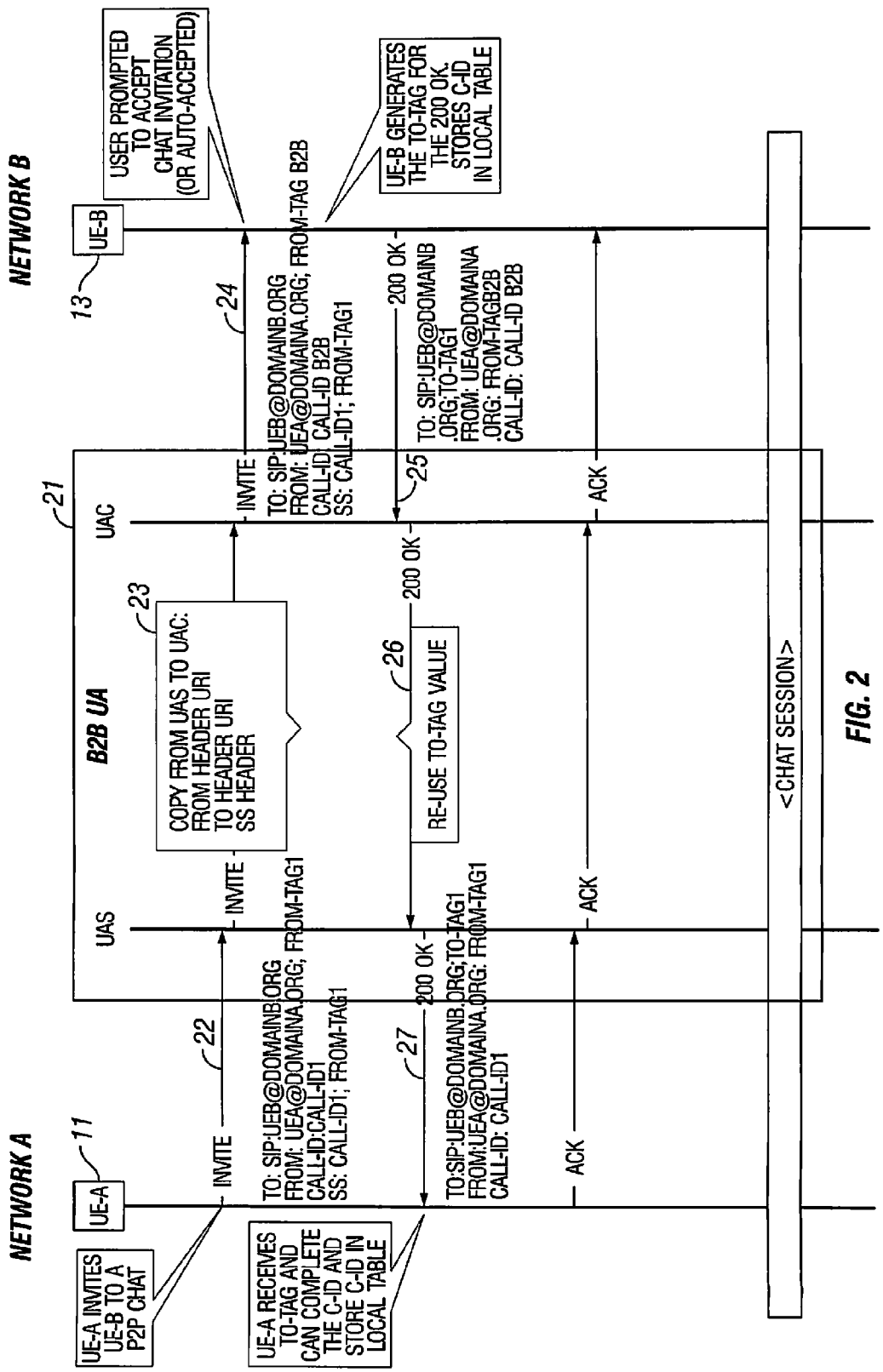
FIG. 2 is a signaling diagram illustrating the flow of messages between various network entities when establishing a P2P session with an intermediary in accordance with the teachings of the present invention.
Figure 3A:
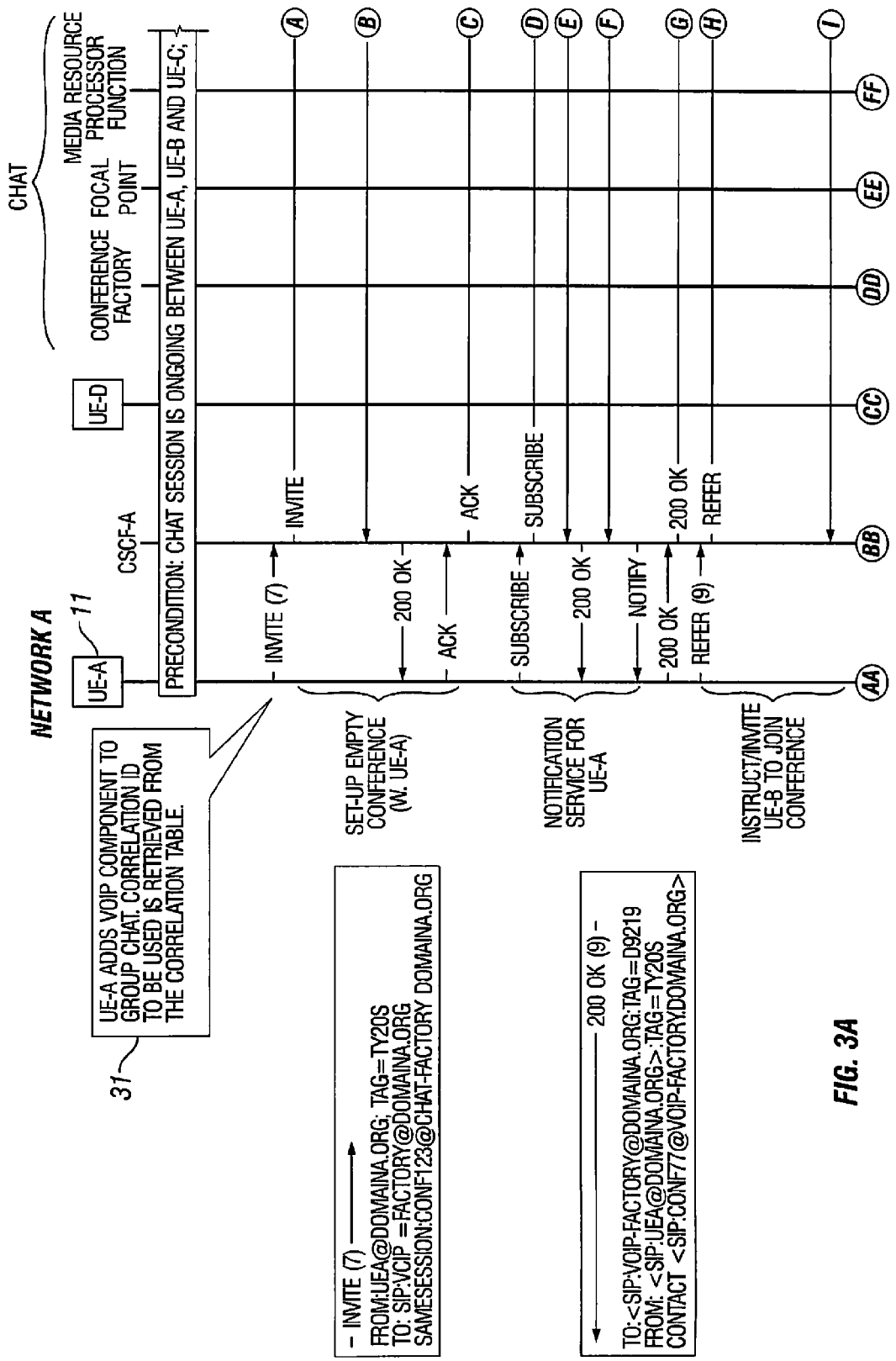
Figure 3B:
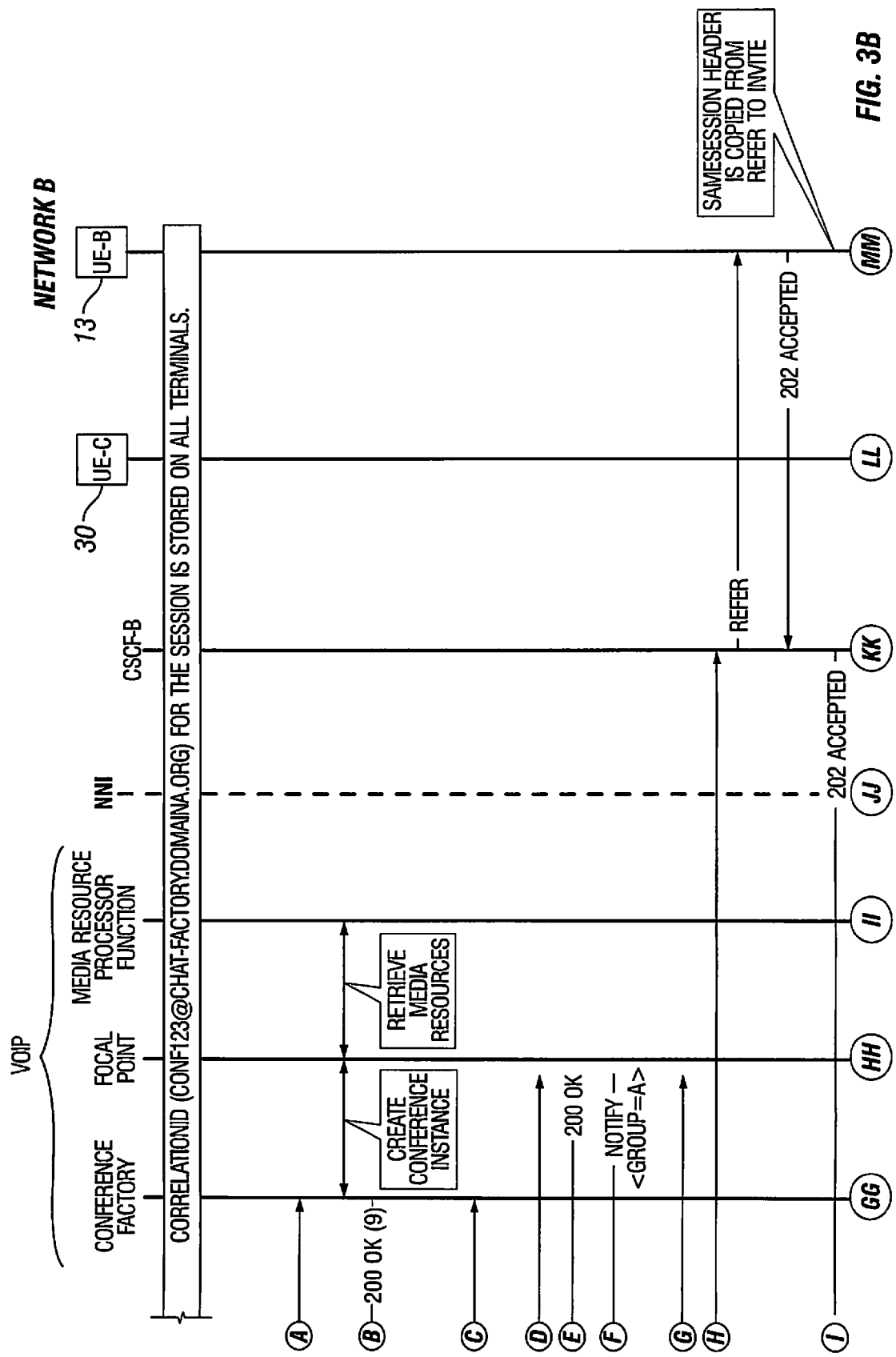

FIG. 2 is a signaling diagram illustrating the flow of messages between various network entities when establishing a P2P session with an intermediary B2B UA 21 in accordance with the present invention. In the event of an intermediary to the P2P flow, the two peers (UE-A 11 and UE-B 13) are not directly connected. Instead, there are two different sessions, one between the intermediary and each respective peer. Therefore, additional logic is required to correlate the sessions. For example, if a B2B UA is placed between the two peers, there are certain functionalities required for the generation of the correlation ID.

The B2B UA shall:
- 22: Receive on first leg at UAS, an INVITE from UE-A directed to UAC
- 23: Copy from server to client side (INVITE): SS information, From header, and To header
- 24: Send INVITE from UAC to UE-B on second leg
- 25: Receive 200 OK from UE-B
- 26: Re-use To-Tag value in the correlation-ID from client to server side (200 OK)
- 27: Send 200 OK from UAS to UE-A on first leg.

The correlation table in this scenario is created and populated in the same way as shown in Table 1 above.

In the case of group communication via a focal point, the correlation ID can be created using the focal point URI. To be able to communicate a common correlation ID to participants of a conference, the correlation ID is included in the REFER request transmitted either to the participant (dial-in) or to the focal point (dial-out). The correlation ID may be included in full in the REFER request. Further, it is required that the receiving party copy the Same-Session header value in the REFER to the Same-Session header of the subsequent INVITE message.

Table 2 below is a correlation table illustrating a scenario in which two communication parties have established one chat and one VoIP session between them via two focal points. Note that the URI of the first focal point is used to create the correlation ID, which is used also for correlation of the second session. Moreover, in a potential case of both sessions traversing the same focal point, the table would be identical.

TABLE 2

| Correlation ID | Dialogue ID | |
|---|---|---|
| conf123@factory.domainA.org | Call-ID1, From-Tag1, To-Tag1 | Chat session |
| conf123@factory.domainA.org | Call-ID2, From-Tag2, To-tag2 | VoIP session |

Additional intermediaries between the communication partners (e.g., the UAC and the focal point(s)) should be transparent to the communication. This means that the content of the Same-Session header should be copied from one side of a B2B UA to the other.

FIGS. 3A-3D are portions of a signaling diagram illustrating the flow of messages between various network entities when performing the correlation process in a group communication case in accordance with the present invention. A precondition for FIGS. 3A-3D is that a chat session is ongoing between UE-A 11, UE-B 13, and UE-C 30. The correlation ID (conf123@chat-factory.domainA.org) is stored on all terminals.

At step 31, UE-A 11 adds a VoIP component to the group chat and invites UE-B 13 to participate. UE-A retrieves from its correlation table, the correlation ID to be used for the VoIP session. UE-A adds the correlation ID to the Same-Session header of the INVITE message 7. Later, UE-A again includes the correlation ID in the Same-Session header of the REFER message 9 sent to UE-B. UE-B copies the Same-Session header from the REFER message into the INVITE message 10, which is returned, signifying UE-B's acceptance. In this manner, the chat session between UE-A, UE-B, and UE-C is correlated with the VoIP session between UE-A and UE-B.

The present invention also includes a method of creating and identifying correlation subsets for independent IMS sessions. The correlation approach described in FIGS. 1, 2, and 3A-3D is based on the principle of correlation groups identified through a single correlation ID. This methodology does not foresee the correlation of a new session with a subset of an existing group of correlated sessions.

According to the procedure described in FIGS. 1, 2, and 3A-3D, a new session can join a group of correlated sessions by sharing its correlation ID. As an enhancement to the aforementioned basic solution, correlation subgroups may be formed. This enhancement does not require additional data to be available to the parties involved in the correlation.

The procedure for the establishment of the first session and creation/communication of the correlation ID is identical to the basic correlation approach. Subsequently, during establishment of a second session to be correlated with the first session, a new correlation ID is created in accordance with the procedures previously described. This additional correlation ID may be communicated in different ways using the Same-Session header field. First, a single header may be utilized containing multiple correlation IDs separated by commas. An example of this approach is:

Same-Session: Correlation ID1, Correlation ID2
Same-Session: Call-Id1;From-Tag1;To-Tag1,Call-Id2;From-Tag2;To-Tag2
Same-Session: 3s09cs03;ty20s;d92119, 4d10dr04;hg30k;e872k8

Alternatively, multiple headers may be utilized, each with a single correlation ID. An example of this approach is:

```
SameSession: Correlation ID1
SameSession: Correlation ID2
SameSession: Call-Id1;FromTag1;ToTag1
SameSession: Call-Id2;FromTag2;ToTag2
SameSession: 3s09cs03;ty20s;d92119
SameSession: 4d10dr04;hg30k;e872k8
```

When individual correlation IDs are carried in multiple headers, the order may be fixed. For example, the value of the first header may be used to indicate the correlation ID of the higher-level session while the value of the second header may be the correlation ID for the new session.

The use of the Same-Session header in the communication flow is analogous to the approach presented in FIGS. 1, 2, and 3A-3D. Here, however, all but the last correlation IDs are already formulated (at the time of establishment of the new session) and inserted in previous Same-Session header(s). The new correlation ID is created as described above and inserted in the new Same-Session header field.

Table 3 below is an exemplary correlation table for the scenario in which two users (A and B) establish three sessions correlated in two subgroups. The correlation table is maintained by the clients.

TABLE 3

| Correlation ID | Dialogue ID | |
|---|---|---|
| Call-ID1, From-Tag1, To-Tag1 | Call-ID1, From-Tag1, To-Tag1 | Chat |
| Call-ID1, From-Tag1, To-Tag1, Call-ID2, From-Tag2, To-Tag2 | Call-ID2, From-Tag2, To-Tag2 | VoIP |
| Call-ID2, From-Tag2, To-Tag2, Call-ID3, From-Tag3, To-Tag3 | Call-ID3, From-Tag3, To-Tag3 | Video |

Figure 4:
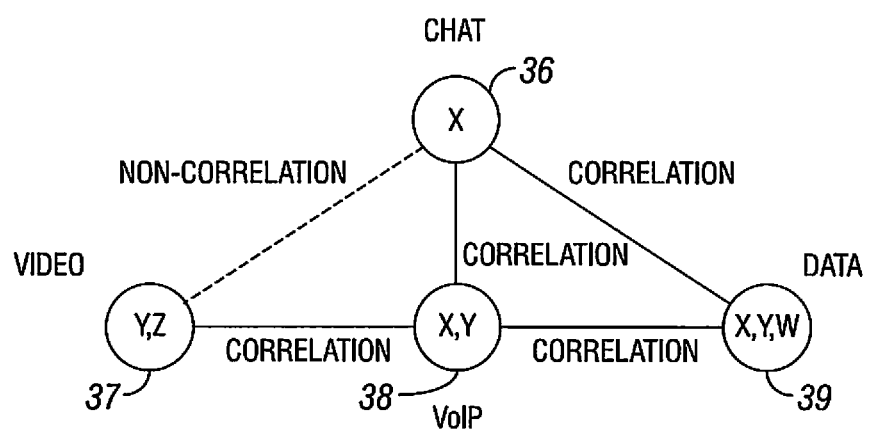
FIG. 4 is an illustrative drawing illustrating a correlation structure between several communication sessions at a high level of abstraction.

FIG. 4 is an illustrative drawing illustrating a correlation structure between four sessions 36-39 at a high level of abstraction. At this level of abstraction, x, y, z, and w represent different correlation IDs. The chat session 36 is correlated with the VoIP session 38 and with the data session 39 using the "x" correlation ID. The Video session 37 is correlated with the VoIP session 38 using the "y" correlation ID. However, the Video session 33 and the chat session 36 are not correlated because they do not share a common correlation ID.

The present invention also includes a method of modifying the correlation ID of an already established session. A further extension to the basic case is to provide the ability to modify the correlation ID of an already established and correlated session. The goal is to modify the correlation table content accordingly. This requires transport of the new correlation ID to the correlation parties along with an instruction to change the previous correlation ID in each party's correlation table. In the context of SIP/IMS, this result may be achieved by sending a re-INVITE for an ongoing session, or by sending another SIP message (for example, MESSAGE, INFO, and the like) within or outside of the ongoing session.

Transporting the information in a SIP MESSAGE method requires the formulation of a request to change the correlation-ID. The request is transported as content by the SIP MESSAGE either within the body of the message or in an additional header (for example, the Same-Session header). The following example illustrates such signaling:

```
MESSAGE sip:user2@domain.com SIP/2.0
Max-Forwards: 70
From: sip:user1@domain.com;tag=49583
To: sip:user2@domain.com
```

-continued

```
Call-ID: asd88asd77a@1.2.3.4
CSeq: 1 MESSAGE
Content-Type: text/plain
CorrelationChange: 3s09cs03;ty20s;d92119 → 4d10dr04;hg30k;e872k8
```

A response (e.g., 200 OK) indicating the result of the change proposal leads to a change in the correlation table of the sender.

The present invention thus provides a system and method for correlating independent IMS sessions.

It should be noted that the present invention correlates two or more sessions between two or more entities. There may be multiple entities in one correlation "group" and each entity may further be residing in separate correlation groups with separate correlation IDs. For example, two P2P sessions may be established, a first session between entity A and entity B, and a second session between entity A and entity C. Both sessions may utilize the same correlation ID. In this case, the correlation allows entity A to perform intelligent actions with this information. Entity C and entity B are not aware of the other session. Further, entity B and entity C may be part of other correlations with other sessions. For example, entity B may conduct another session with entity C or with entity D utilizing a different correlation ID.

Correlation IDs may also be utilized to form subgroups between different entities. In the basic case, a single correlation ID is shared by all sessions in the correlation group. In an advanced case, a new correlation ID is created for every new session and the correlation IDs are concatenated to signify a correlation group. For example, entity A may start a session with entity B utilizing correlation ID (X). Entity C then connects to entity B and creates a new correlation ID (Y). By concatenating X and Y (X,Y) a correlation ID is formed which signifies a correlation group including both the A-B session and the B-C session. If a fourth party wishes to establish a session, it can choose to correlate with either (X) or (Y) or (X,Y). It may also set up a totally new correlation ID (Z).

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of correlating different end-to-end data sessions, said method comprising:
creating a globally unique correlation identifier during establishment of a first end-to-end data session between a first party and a second party, wherein the first party sends a first portion of the correlation identifier including a Call-ID and a From-Tag to the second party in a Same-Session header of a SIP INVITE message, and the second party adds a second, completing portion of the correlation identifier to the first portion and sends the completed correlation identifier to the first party in a SIP 200 OK message responsive to the SIP INVITE message, wherein the second portion includes a To-Tag which uniquely identifies the second party;
locally storing the correlation identifier by the first and second parties, wherein each party stores the correlation identifier in a local mapping unit that maps correlation identifiers to session identifiers, said mapping unit being selected from a group consisting of a correlation table, a hash function, and a mapping function; and utilizing the correlation identifier by the first or second party to correlate with the first end-to-end data session, a second, independent end-to-end data session subsequently established by the first or second party.

2. The method according to claim 1, wherein the step of utilizing the correlation identifier to correlate the first and second end-to-end data sessions includes:

receiving a complete correlation identifier in a setup message during establishment of the second end-to-end data session;

accessing the local mapping unit to find a match for the received complete correlation identifier;

when the match is found, associating a session identifier for the second end-to-end data session with the found correlation identifier in the local mapping unit; and when the match is not found, storing the session identifier for the second end-to-end data session and the received complete correlation identifier in the local mapping unit.

3. The method according to claim 1, wherein the second end-to-end data session is established between the first and second parties.

4. The method according to claim 1, wherein the second end-to-end data session is established between the first party and a third party, wherein the first and second end-to-end data sessions are correlated as a group of sessions.

5. The method according to claim 1, wherein the first end-to-end data session is a point-to-point (P2P) session and an intermediary is interposed between the first party and the second party, said intermediary conducting a first P2P session with the first party and a second P2P session with the second party, and wherein the correlation identifier is created utilizing the Call-ID, the From-Tag, and the To-Tag, wherein the intermediary forwards the Call-ID and the From-Tag to the second party in the SIP INVITE message, and forwards the To-Tag to the first party in the SIP 200 OK message.

6. The method according to claim 1, wherein the step of creating the globally unique correlation identifier includes creating the globally unique correlation identifier for a group communication session utilizing a unique focal point identifier communicated to the first party by a conference factory while creating a conference.

7. The method according to claim 6, wherein the globally unique correlation identifier is communicated to all participants of the conference by including the globally unique correlation identifier in a REFER request transmitted from the first party to each participant in a dial-in conference, and to a focal point in a dial-out conference.

8. The method according to claim 1, further comprising modifying the globally unique correlation identifier, said modifying step including:

creating a new correlation identifier;

sending the new correlation identifier to the first and second parties along with an instruction to change the globally unique correlation identifier to the new correlation identifier; and storing the new correlation identifier by the first and second parties.

9. The method according to claim 8, wherein the step of sending the new correlation identifier to the first and second party includes sending the new correlation identifier and the instruction in a SIP message selected from a group consisting of a re-INVITE message for the first or second end-to-end data session, a MESSAGE message, and an INFO message.

10. A method of correlating different end-to-end data sessions, said method comprising:

establishing a first end-to-end data session between a first party and a second party;

creating a first globally unique correlation identifier (X) during establishment of the first end-to-end data session, wherein the first party sends a first portion of the first globally unique correlation identifier including a Call-ID and a From-Tag to the second party in a Same-Session header of a SIP INVITE message, and the second party adds a second, completing portion of the first globally unique correlation identifier to the first portion and sends the completed first globally unique correlation identifier to the first party in a SIP 200 OK message responsive to the SIP INVITE message, wherein the second portion includes a To-Tag which uniquely identifies the second party;

locally storing the first globally unique correlation identifier (X) by the first and second parties, wherein each party stores the first globally unique correlation identifier in a local mapping unit, said mapping unit being selected from a group consisting of a correlation table, a hash function, and a mapping function;

establishing a second, independent end-to-end data session between the second party and a third party;

creating by the second and third parties, a second globally unique correlation identifier (Y) during establishment of the second, independent end-to-end data session; and sending the second globally unique correlation identifier (Y) from the second party to the first party; and concatenating by the first, second, and third parties, the first and second globally unique correlation identifiers to form a third correlation identifier (X,Y) which identifies a correlated group of independent end-to-end data sessions.

11. The method according to claim 10, further comprising:

establishing a third, independent end-to-end data session between the first party and a fourth party, wherein the fourth party determines whether to form a correlated group of independent end-to-end data sessions by selecting a correlation identifier for the third, independent end-to-end data session from a group consisting of:

the first globally unique correlation identifier (X);

the second globally unique correlation identifier (Y);

the third correlation identifier (X,Y); and a fourth correlation identifier (Z).

12. The method according to claim 11, wherein the correlation identifiers are transported to each party in a single Same-Session header.

13. The method according to claim 11, wherein the correlation identifiers are transported to each party in a plurality of Same-Session headers.

14. A system for correlating different end-to-end data sessions, said system comprising:

a first communication device; and a second communication device in communication with the first communication device;

wherein each of the first and second communication devices includes:

a local mapping unit configured to map correlation identifiers to session identifiers, the mapping unit being selected from a group consisting of a correlation table, a hash function, and a mapping function; and a processor configured to cause the first and second communication devices to create a globally unique correlation identifier during establishment of a first end-to-end data session between the first and second communication devices;

wherein the first communication device is configured to send a SIP INVITE message to the second communication device during establishment of the first end-to-end data session, wherein the first communication device is configured to include a Call-ID and a From-Tag in a Same-Session header of the SIP INVITE message;

wherein the second communication device is configured to add a second, completing portion of the globally unique correlation identifier to the first portion and to send the completed globally unique correlation identifier to the first communication device in a SIP 200 OK message responsive to the SIP INVITE message, wherein the second portion includes a To-Tag which uniquely identifies the second communication device;

wherein the first and second communication units are configured to store the globally unique correlation identifier in their local mapping units and to utilize the stored globally unique correlation identifier to correlate with the first end-to-end data session, a second, independent end-to-end data session subsequently established by the first communication device or the second communication device.

15. The system according to claim 14, wherein when the second, independent end-to-end data session is established, the local correlation unit of the second or first communication device is configured to receive from the first or second communication device, respectively, a query including the globally unique correlation identifier, and to associating a session identifier for the second end-to-end-data session with the globally unique correlation identifier.

16. The system according to claim 14, wherein the second end-to-end-data session is established between the first and second communication devices.

17. The system according to claim 14, wherein the second end-to-end-data session is established between the first communication device and a third communication device, wherein the first and second end-to-end-data sessions are correlated as a group of sessions.

18. The system according to claim 14, further comprising an intermediary interposed between the first and second communication devices, said intermediary conducting a first P2P session with the first communication device and a second P2P session with the second communication device, and wherein logic creates the globally unique correlation identifier utilizing the Call-ID, the From-Tag, and the To-Tag, wherein the intermediary forwards the Call-ID and the From-Tag to the second communication device in the SIP INVITE message, and forwards the To-Tag to the first communication device in the SIP 200 OK message.

19. The system according to claim 14, wherein the first and second communication devices are configured to create the globally unique correlation identifier for a group communication session utilizing a unique focal point identifier communicated to the first communication device by a conference factory while creating a conference.

20. The system according to claim 19, wherein the first communication device is configured to send the globally unique correlation identifier to all participants of the conference by including the globally unique correlation identifier in a REFER request transmitted by the first communication device to each participant in a dial-in conference, and to a focal point in a dial-out conference.

21. A first communication device for correlating different end-to-end data sessions, said first communication device comprising:
a mapping unit; and
a processor configured to cause the first communication device to:
send a SIP INVITE message to a second communication device during establishment of a first end-to-end data session between the first communication device and the second communication device, wherein the first communication device is configured to include a Call-ID and a From-Tag in a Same-Session header of the SIP INVITE message;
receive from the second communication device in response to the SIP INVITE message, a SIP 200 OK message including a globally unique correlation identifier comprising the Call-ID, the From-Tag, and a To-Tag added by the second communication device to uniquely identify the second communication device;
store the globally unique correlation identifier in the mapping unit, wherein the mapping unit is configured to map correlation identifiers to session identifiers, the mapping unit being selected from a group consisting of a correlation table, a hash function, and a mapping function; and
utilize the stored globally unique correlation identifier to correlate with the first end-to-end data session, a second, independent end-to-end data session subsequently established by the first communication device or the second communication device.

22. A second communication device for correlating different end-to-end data sessions, said second communication device comprising:
a mapping unit; and
a processor configured to cause the second communication device to:
receive from a first communication device, a SIP INVITE message during establishment of a first end-to-end data session between the first communication device and the second communication device, wherein a Same-Session header of the SIP INVITE message includes a Call-ID and a From-Tag;
create a globally unique correlation identifier by adding a To-Tag to the Call-ID and the From-Tag, the To-Tag uniquely identifying the second communication device;
send the globally unique correlation identifier to the first communication device in a SIP 200 OK message in response to the SIP INVITE message;
store the globally unique correlation identifier in the mapping unit, wherein the mapping unit is configured to map correlation identifiers to session identifiers, the mapping unit being selected from a group consisting of a correlation table, a hash function, and a mapping function; and
utilize the stored globally unique correlation identifier to correlate with the first end-to-end data session, a second, independent end-to-end data session subsequently established by the first communication device or the second communication device.

* * * * *